Oct. 31, 1950     J. A. LORITSCH     2,528,235
COATING AND IMPREGNATING COMPOSITIONS
AND ARTICLES PRODUCED FROM THE SAME
Filed June 26, 1945

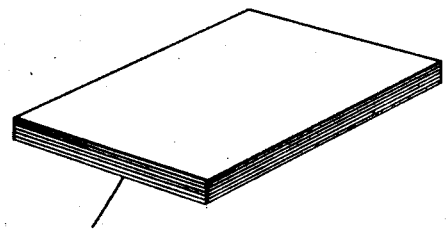

Fig.1.

LAMINATED PRODUCT COMPRISING LAMINAE, E.G., SHEETS OF
GLASS-FIBER CLOTH, BONDED TOGETHER WITH A POLYVINYL
ACETAL RESIN-MODIFIED COPOLYMER OF A POLYMERIZABLE
UNSATURATED ALKYD RESIN AND A POLYALLYL ESTER

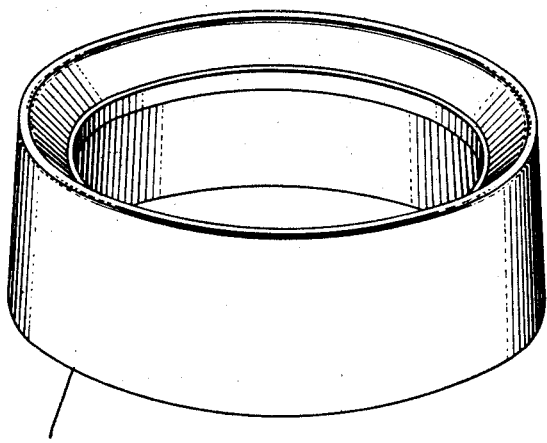

Fig.2.

COMMUTATOR CONE COMPRISING SHEETS OF INSULATING
MATERIAL, E.G., GLASS-FIBER CLOTH, ASBESTOS, ETC.,
BONDED TOGETHER WITH A BINDER OF THE KIND
DESCRIBED IN FIG.1.

Inventor:
John A. Loritsch,
by    *Andrew Cohen*
His Attorney.

Patented Oct. 31, 1950

2,528,235

UNITED STATES PATENT OFFICE 2,528,235

COATING AND IMPREGNATING COMPOSITIONS AND ARTICLES PRODUCED FROM THE SAME

John A. Loritsch, Scotia, N. Y., assignor to General Electric Company, a corporation of New York Application June 26, 1945, Serial No. 601,591

7 Claims. (Cl. 154—43)

This invention relates to new and useful coating and impregnating compositions and to articles produced from the same. More particularly the invention is concerned with new and useful laminating compositions and laminated products.

The present invention relates specifically to a coating and impregnating composition, which is especially adapted for use as a laminating composition in the production of laminated articles, and which comprises: (1) a polymerizable unsaturated alkyd resin obtained by the esterification reaction of a mixture of ingredients comprising a polyhydric alcohol and an alpha saturated alpha, beta polycarboxylic acid, e. g., diethylene glycol maleate, (2) a polyester compatible with the resin of (1) and obtained by esterification of allyl alcohol with a polybasic acid, specifically a polycarboxylic acid, e. g., diallyl phthalate, (3) a catalyst for accelerating the copolymerization of the ingredients of (1) and (2), e. g., benzoyl peroxide, and (4) a polyvinyl acetal resin, specifically a polyvinyl formal resin, in an amount corresponding to from 15 to 75 per cent by weight of the total of (1), (2) and (4). Articles of this invention include laminated products comprising laminae, e. g., superimposed sheet of permeable material, specifically sheet asbestos, glass-fiber cloth, etc., bonded together (more particularly, in the case of permeable material, impregnated and bonded together) with a copolymer of the ingredients of (1) and (2), which copolymer has incorporated therein a resin of the kind and in the amount specified under (4) above. The coating and impregnating compositions, specifically laminating compositions, of this invention preferably, although not necessarily, include a volatile solvent for the ingredients of (1), (2) and (4), e. g., ethylene dichloride, a mixture of ethyl alcohol and 1-nitropropane, a mixture of ethyl alcohol and toluene, etc.

It was suggested prior to my invention that compositions suitable for laminating and molding applications contain as the bonding agent a mixture of a polyallyl ester, e. g., diallyl phthalate, diallyl maleate, etc., and a polymerizable unsaturated alkyd resin, e. g., ethylene glycol maleate, diethylene glycol maleate, etc., and a catalyst for accelerating the copolymerization of the said mixed ingredients. However, the successful and efficient use of such compositions in making laminated articles presents numerous difficulties. A primary difficulty results from the fact that, due to the relatively low viscosity which such compositions usually possess (particularly at elevated temperatures), it is difficult to retain them in the fabric or other material treated therewith. Excessive drainage occurs during the so-called "lay-up" part of the lamination process, and especially during the application of heat and pressure to the superimposed, coated and impregnated laminations. Hence, it is exceedingly difficult, and in many cases impossible, to obtain laminated products having optimum physical properties, e. g., high mechanical strength and water resistance, and the desired electrical properties.

In general, a satisfactory laminating composition of the polymerizable type should meet the following requirements:

1. It should yield, upon application to a sheet material (e. g., a fabric), a product which is non-tacky, or substantially so, is not wet and which can be readily rolled or stored without loss of material. Furthermore, liquid should not drain from the treated material during the subsequent baking operation.

2. The treated sheet material, after being cut to size and stacked, should be capable of being laminated under heat, either at low pressures (contact pressure to a pressure of, say, 300 pounds per square inch) or at high pressures (above 300 pounds per square inch, more particularly at, for instance, 600 to 800 pounds per square inch) in conventional equipment without undue loss of binder.

3. The composition should be such that it cures sufficiently in the press, within a reasonable period of time, so that subsequent heating of the laminated product does not cause any blistering, delamination or warping.

4. It should provide a finished laminated product, that is, a completely cured product, which is not appreciably deformed under load or stress by heat.

5. It should provide a finished laminated product which, if the product is to be used in electrical applications, does not show a rapidly increasing power factor with an increase in temperature.

I have discovered that the difficulties set forth in the third paragraph of this specification are obviated, and a composition meeting the requirements stated in the preceding paragraph is obtained, by the use of the coating and impregnating composition, specifically laminating composition, broadly described in the second paragraph of this specification. These results are obtained by modifying the mixture of polyallyl ester and compatible, polymerizable, unsaturated alkyd resin with a polyvinyl acetal resin, specifically a polyvinyl formal resin, in an amount not less than 15% and not more than 75%, preferably not more than about 50 or 60%, by weight of the total amount of polyallyl ester, polymerizable unsaturated alkyd resin and polyvinyl acetal resin in the composition. When used within these limits the polyvinyl acetal resin improves the physical properties of the cured product, since it provides, for example, greater mechanical strength, increased toughness and, in certain cases, better water resistance in laminated products made from the compositions of the invention, while at the same time the compositon meets all five of the requirements mentioned in the prior paragraph. This was quite surprising and in no way could have been predicted from the known properties of the individual ingredients of the composition, especially in view of the fact that similar compositions having no polyvinyl acetal resin incorporated therein do not meet the first three requirements given in the preceding paragraph. Furthermore, the polyvinyl acetal resin is, within the stated limits, at least partly compatible with the mixture of polyallyl ester and polymerizable unsaturated alkyd resin, does not inhibit or retard polymerization of the said mixture, and has a molecular weight sufficiently high that it does not liquefy at the drying or laminating temperatures employed.

In marked contrast to the unmodified, polymerizable polyallyl ester-unsaturated alkyd resin compositions, the polyvinyl acetal resin-modified compositions provide treated sheet materials, e. g., fabrics, which can be:

1. Laminated hot (e. g., at 100° to 150° C.) at both low and high pressures as described under (2) of the fourth paragraph of this specification (the pressure employed depending, for example, upon the shape of the piece) without undue flashing of the binder or any slippage of the plies.

2. Laminated under heat and pressure with ready expulsion of air between laminae as the plies knit together.

3. Laminated at one temperature in the press to produce a panel or laminate that will not delaminate on further cure in an oven.

4. Readily rolled and stored without difficulty in retaining the coating and impregnating composition on and in the fabric.

The polyvinyl acetal resins used in carrying the present invention into effect are not the equivalent of such materials as urea-formaldehyde resins, phenol-formaldehyde resins, glycol phthalate, polymerized isobutylene, ester gum, rosin and other natural resins, etc., since materials of this kind either are incompatible with the mixture of polyallyl ester and polymerizable unsaturated alkyd resin, or they inhibit or retard polymerization of the aforesaid mixture, or they liquefy at the drying or laminating temperatures employed.

In the accompanying drawing, Fig. 1 represents a laminated product comprising laminae, e. g., sheets of glass-fiber cloth, bonded together with a polyvinyl acetal resin-modified copolymer of a polymerizable unsaturated alkyd resin and a polyallyl ester; and Fig. 2 shows a commutator cone comprising sheets of insulating material, e. g., glass-fiber cloth, asbestos, etc., bonded together with a binder of the kind described in Fig. 1.

In preparing the coating and impregnating compositions of this invention a suitable practice is to dissolve or disperse the polymerization catalyst, e. g., benzoyl peroxide, in the polyallyl ester. The polymerizable unsaturated alkyd resin is then mixed with the catalyst-containing polyallyl ester. I prefer to employ a solvent-containing composition and, in such cases, preferably dissolve the polyvinyl acetal resin in a mutual solvent for the polyvinyl acetal resin, polyallyl ester and unsaturated alkyd resin. The catalyst-containing mixture of polyallyl ester and unsaturated alkyd resin then is mixed, as by stirring, with the solution of the polyvinyl acetal resin.

In order that those skilled in the art better may understand how the present invention may be carried into effect, the following examples, are given by way of illustration and not by way of limitation. All parts and percentages are by weight.

*Example 1*

A solution of polyvinyl formal resin ("Formvar") was formed by dissolving 120 parts of the resin in 1080 parts ethylene dichloride. To this solution was added a mixture of 180 parts diallyl phthalate, 180 parts diethylene glycol maleate (acid value 50 to 60) and 7.2 parts of a polymerization catalyst, specifically benzoyl peroxide. After thoroughly stirring the mixture, a clear, yellow, viscous liquid resulted.

Pieces of de-sized glass-fiber cloth, 7 mils thick, were coated and impregnated with the above laminating composition by immersing in a bath of the composition. After removal from the bath the pieces were suspended on a rack so as to drain off the excess liquid composition, after which they were air-dried for 30 minutes or more. Seven layers of the resulting dry, non-tacky, impregnated cloth were laminated between metal plates at 600 pounds per square inch for 30 minutes at 100°–115° C. No slippage of the plies and only normal flashing of the binder occurred. (The flash material was a plastic solid which did not liquefy and run down the sides of the press.) The laminated product was removed from the press while hot and further heated in a 100° C. oven for 16 hours. A strong, translucent laminated article having a binder content of 48% resulted. There was no evidence of delamination anywhere in the laminated piece.

A laminated product similarly made from the same composition but using 16 layers of the same glass-fiber cloth showed the following physical and electrical properties:

Specific gravity at room temperature, 1.68
Tensile strength, 32,070 pounds per sq. in.
Flexural strength, 39,800 pounds per sq. in.
Compression strength, 60,900 pounds per sq. in.
Izod impact strength, 17.7 foot pounds
Moisture absorption (after 24 hours immersion in water at room temp.), 0.44%
Power factor at room temp., 1 m. c., 0.02
Dielectric strength, 724 volts per mil
Dielectric constant at room temp., 1 m. c., 4.35

*Example 2*

Same as Example 1 with the exception that 16 layers of glass-fiber cloth were laminated at 100°–105° C. for 15 minutes under a pressure of 80 pounds per square inch. No undue flashing of the binder or slippage of the plies occurred. The product was a translucent, strong laminate which did not delaminate on further heating at 100° C.

*Example 3*

Twelve turns of 0.005-inch tape formed of woven glass fibers were treated with the composition of Example 1. The dry, impregnated turns were wound on a round steel mandrel under hand tension only. The mandrel and windings were heated for 2 hours in a 100° C. oven, no pressure being applied. The tube formed in this manner was a rigid, dense, well-bonded structure. There was no drainage or flow of the binder during the curing operation.

*Example 4*

Six sheets of 2-mil nylon cloth were treated with the composition of Example 1. The dry, impregnated sheets were superimposed and laminated at 125° C. under a pressure of 500 pounds per square inch. After curing for 30 minutes in the press, the panel was further baked at 115° C. for 16 hours. A strong, flexible laminate resulted.

*Example 5*

Six sheets of a felt of glass fibers, 10 mils thick, were treated with the composition of Example 1. (The fibers were sized with a polymerized furfuryl alcohol resin.) After stacking the dry, impregnated sheets, the stack was heated for 15 minutes at 110° C. under a pressure of 600 pounds per square inch. Complete curing of the binder was obtained by further heating the laminated product for 16 hours in a 100° C. oven. A strong, translucent, laminated article was obtained.

*Example 6*

Sixteen sheets of absorbent kraft paper, 4 mils thick, were treated with the composition of Example 1. After superimposing the dry, impregnated sheets, they were laminated by heating in a press for 30 minutes at 100°–110° C. under a pressure of 800 pounds per square inch. The laminated product was further heated in a 100° C. oven for 20 hours, yielding a strong, translucent laminate.

*Example 7*

Four sheets of a heavy asbestos cloth, about 50 mils thick, were treated with the composition of Example 1. The dry, impregnated sheets were stacked and then bonded together to form a laminated product by heating at 105°–110° C. for 30 minutes at a pressure of 800 pounds per square inch. After additional heating for 16 hours in a 100° C. oven, a strong, well-bonded laminate was obtained.

*Example 8*

A roll of cotton tape, 1 inch wide and 7 mils thick, was treated with the composition of Example 1. The dry, impregnated tape was spirally wound under tension over a 2-inch-diameter wooden cylinder covered with a layer of cellophane. The traverse was 10 inches. The direction of the spiral was reversed on alternate layers. Four layers were built up in this manner. The layers were bonded together by heating for 3 hours at 100° C. The resulting strong, dense tubing was removed from the mandrel. It may be used, for example, as a spool body upon which conductor windings are wound in the production of electrical coils.

*Example 9*

Three sheets of de-sized glass-fiber cloth, 3 mils thick, were treated with the composition of Example 1. The dry, impregnated sheets were stacked upon a sheet of lead 5 mils thick. The entire assembly was heated for 20 minutes at 115° C. under a pressure of 600 pounds per square inch. To effect further curing of the binder, the laminated product was heated for an additional 16 hours in a 100° C. oven. A well-bonded laminate was obtained. It is suitable for use as an X-ray screen. Because of the strong backing, the lead sheet does not crease on flexing, and has sufficient rigidity to be readily handled in large sizes.

*Example 10*

De-sized glass fiber tape, 2 inches wide and 5 mils thick, was treated with the composition of Example 1. The dry, impregnated tape was wound on a metal bus bar, butt jointed and spiraled to form three layers. Contact pressure only was used, that is, just sufficient pressure to cause the tape to conform to the shape of the bus bar. The taped bus bar was heated for 2 hours at 100° C. to bond the layers together and to form a well-insulated structure. The insulated bar showed an average dielectric strength of 620 volts per mil (at 18 mils thickness) before electrical breakdown occurred. There was no breakdown at the corners of the bar.

In marked contrast to the foregoing a similar tape treated with a polymerizable composition comprising 100 parts each of diallyl phthalate and diethylene glycol maleate (acid value 50 to 60) and 2 parts of benzoyl peroxide, when applied to a similar bus bar and heated for 2 to 3 hours at 100° C., yielded an insulated bus bar having an average dielectric strength of only 400 volts per mil (at 15 mils thickness), and in which electrical breakdown occurred at the corners of the bar.

Greater flexibility in the laminated product under the same conditions, for example using the same number of sheets of the same material, may be obtained, for instance, by increasing the ratio of the polyvinyl acetal resin, specifically polyvinyl formal resin, to the mixture of the polymerizable unsaturated alkyd resin and polyallyl ester; or by replacing part of the unsaturated polycarboxylic acid of the alkyd resin with a saturated aliphatic polycarboxylic acid or with an aromatic polycarboxylic acid. This is shown by Examples 11 and 12.

*Example 11*

A solution of polyvinyl formal resin was prepared by dissolving 80 parts of the resin in 720 parts ethylene dichloride. To this solution was added a mixture of

| | Parts |
|---|---|
| Diallyl phthalate | 40.0 |
| Diethylene glycol maleate (acid value 50 to 60) | 40.0 |
| Di-(tertiary-butyl perphthalate) | 1.6 |
| Polymerization inhibitor, specifically quinone | 0.008 |

The resulting mixture was thoroughly stirred to form a homogeneous solution.

Pieces of de-sized glass-fiber cloth, 3 mils thick, were coated and impregnated with the above laminating composition in the same manner as described under Example 1. Sixteen sheets of the dry, impregnated cloth were superimposed and then laminated by heating in a press for 30 minutes at 110° to 115° C. under a pressure of 500 pounds per square inch. The laminated product was further heated in a 100° C. oven for 16 hours to complete the cure of the binder. The resulting laminated product was tough, flexible and strong.

Example 12

A solution of polyvinyl formal resin was prepared by dissolving 60 parts of the resin in 540 parts ethylene dichloride. To this solution was added a mixture of

|  | Parts |
|---|---|
| Diallyl phthalate | 45.0 |
| Diethylene glycol maleate phthalate [1] | 135.0 |
| Di-(tertiary-butyl perphthalate) | 3.6 |
| Quinone | 0.018 |

[1] This resin, which had an acid number of about 60.5, was prepared by heating in a purified hydrogen atmosphere 700 parts (6.6 mols) diethylene glycol, 196 parts (2 mols) maleic anhydride and 592 parts (4 mols) phthalic anhydride for about 6 hours at 150° to 210° C.

A laminate of glass-fiber cloth was prepared as described under Example 11 but using the laminating composition of this example instead of the binder of the preceding example. In this case, too, a tough, flexible, strong, laminated product was obtained.

Example 13

One hundred parts of polyvinyl butyral resin ("Butvar") were dissolved in 1000 parts ethylene dichloride. To the resulting clear solution were added and dissolved:

|  | Parts |
|---|---|
| Diallyl phthalate | 150 |
| Diethylene glycol maleate (about 50 to 60 acid value) | 150 |
| Benzoyl peroxide | 6 |

Eight sheets of de-sized glass-fiber cloth, 7 mils thick, were treated with this liquid composition, drained, and air-dried. The film formed on the cloth was soft and substantially free from tack. The eight sheets were stacked and laminated by heating for 1 hour at 100° C. under a pressure of ½ pound per square inch. A strong, well-bonded laminate was formed.

The following example illustrates the results obtained when an effort is made to laminate sheet material in a conventional press with an unmodified mixture of a polyallyl ester and a polymerizable unsaturated alkyd resin.

Example 14

|  | Parts |
|---|---|
| Diallyl phthalate | 50.0 |
| Diethylene glycol maleate | 50.0 |
| Tertiary-butyl perbenzoate | 1.6 | were mixed together to form a laminating composition. Sheets of glass-fiber cloth were impregnated with this composition by immersing in a bath of the composition and scraping off the excess with a doctor blade. The resulting wet sheets were superimposed (16 to a stack) and laminated in a press under the conditions mentioned and with the stated results:

1. For 30 minutes at 125° C. under a pressure of 200 pounds per square inch. Excess resin ran down the sides of the press. The final resin content of the laminate was 29%, which was too low for good properties.

2. For 30 minutes at 125° C. under a pressure of 30 pounds per square inch. Excess resin ran down the sides of the press. Final resin content of the laminate was 35%, which also was too low for good properties.

3. For 30 minutes at 125° C. under a pressure of 3 pounds per square inch. Excess resin ran down the sides of the press. Final resin content of the laminate was 47%.

Since most low-pressure laminating techniques involving the use of a rubber bag to shape the plies employ pressures around 60 pounds per square inch, it is clear from this example that such pressures are impractical with the laminating composition of this example unless it be confined in some manner during the pressing operation.

It will be understood, of course, by those skilled in the art that my invention is not limited to the specific ingredients and proportions thereof that are given in the above illustrative examples. Thus, instead of diethylene glycol maleate or diethylene glycol maleate phthalate, I may use any other polymerizable unsaturated alkyd resin, for example glyceryl itaconate, glyceryl maleate, ethylene glycol maleate, diethylene glycol itaconate, propylene glycol fumarate, triethylene glycol maleate, esterification products of ethylene glycol, itaconic acid and phthalic anhydride, of diethylene glycol, itaconic acid and succinic acid, of ethylene glycol, maleic anhydride and adipic acid, of diethylene glycol, maleic anhydride and itaconic acid, of diethylene glycol, maleic anhydride and stearic acid, of glycerine, maleic anhydride and phthalic anhydride, of glycerine, maleic anhydride and octyl alcohol, etc. Other examples of polymerizable unsaturated alkyd resins that may be used are given, for example, on page 4 of D'Alelio Patent No. 2,308,495, issued January 19, 1943.

Also, instead of diallyl phthalate specifically mentioned in the above examples, I may use any other polyallyl ester of a polybasic acid, for example, the diallyl esters of carbonic, oxalic, malonic, succinic, glutaric, adipic, pimelic, suberic, sebacic, azelaic, maleic, fumaric, itaconic, benzoyl phthalic, mesaconic, citraconic, tartronic, malic, gluconic, tartaric, isophthalic, terephthalic, benzophenone-2,4'-dicarboxylic, etc., acids; di- and tri-allyl citrates, tricarballylates, aconitates, phosphates, silicates, etc.; tetra-allyl silicate, the tetra-allyl ester of benzene tetracarboxylic acid, etc.

The proportions of polymerizable unsaturated alkyd resin, e. g., diethylene glycol maleate, and polyallyl ester, e. g., diallyl phthalate, may be varied considerably, but ordinarily I use these copolymerizable materials in the ratio of, by weight, about 1 to 3 parts of the former to 1 part of the latter. When the aforementioned components are used within these proportions, particularly useful coating and impregnating compositions, e. g., laminating compositions, are obtained when the polyvinyl acetal resin, specifically polyvinyl formal resin, is used in an amount corresponding to from 20 to 30 per cent by weight of the combined weight of polymerizable unsaturated alkyd resin, polyallyl ester and polyvinyl acetal resin. The composition also contains a small amount of a polymerization catalyst, e. g., benzoyl peroxide, for accelerating the copolymerization of the polymerizable unsaturated alkyl resin and polyallyl ester.

Instead of polyvinyl formal or polyvinyl butyral resins specifically mentioned in the examples, I may use any other polyvinyl acetal resin. Such resinous compositions are described, for example, in Morrison et al. Reissue Patent No. 20,430 and, as pointed out in said patent, may be produced from various aldehydes and polyvinyl esters. Thus, the aldehyde may be, for instance, formaldehyde, acetaldehyde, propionic aldehyde, butyric aldehyde, benzaldehyde, etc., or mixtures of these or other aldehydes, and the polyvinyl ester may be, for example, polyvinyl acetate, polyvinyl propionate, polyvinyl butyrate, etc. The properties of the polyvinyl acetal resins may be varied through a wide range of varying the viscosity and the extent of the hydrolysis of the polyvinyl ester, the amount and the character of the aldehyde reacted with the hydrolized polymerized vinyl ester, and the kind and amount of acid catalyst used.

Various polymerization catalysts may be used in addition to those given in the examples, for instance inorganic peroxides such as barium peroxide, sodium peroxide, etc.; organic peroxides, e. g., phthalic peroxide, succinic peroxide, acetyl peroxide, lauryl peroxide, stearyl peroxide, ascaridole, tertiary-butyl hydroperoxide and other peroxides such as given in Nordlander and Loritsch copending application Serial No. 599,164, filed June 13, 1945, now Patent No. 2,524,436, and assigned to the same assignee as the present invention; various per-compounds such as perborates, persulfates, perchlorates, etc., various salts, e. g., aluminum chloride, etc.; metal compounds of unsaturated acids as, for example, cobalt and manganese resinates, linoleates, maleates, etc. Any suitable amount of catalyst may be used, but in general the catalyst concentration will be within the range of 0.2 to 4 per cent by weight of the mixture of polyallyl ester and polymerizable unsaturated alkyd resin.

Likewise any suitable solvent may be employed, e. g., furfural, ethylene dichloride, dioxane, chloroform, a mixture (e. g., a 50-50 mixture) of ethyl alcohol and 1-nitropropane, or a mixed solvent formed, for instance, of an aromatic hydrocarbon, e. g. benzene, toluene, xylene, etc., and any one or more of the following saturated alcohols: methyl, ethyl, n-propyl, n-butyl, n-amyl, hexyl or octyl alcohols, more particularly a mixture form of, by volume, 30% ethyl alcohol and 70% toluene etc. The amount of solvent may be varied as desired or as conditions may require, e. g., from 5 to 600% by weight of the total polyallyl ester, polymerizable unsaturated alkyd resin and polyvinyl acetal resin; or, depending upon the application of the composition and its formulation, it may be omitted entirely. For most applications I prefer to use a composition containing about 25 to 35%, more particularly about 30% solids, the remaining being volatile solvent. Such a composition, more particularly a composition of the same general kind as described under Example 1, will have (with about 30% solids in ethylene dichloride as solvent) a viscosity at 25° C. of the order of 820 to 880 centipoises.

The coating and impregnating compositions of this invention may be applied to a fabric such, for example, as glass-fiber cloth by conventional treating equipment such, for instance, as squeeze rolls or a doctor blade, to form a soft, tough, dry-to-touch film that will not flow at room temperature. The resin content of the fabric is preferably controlled so that the coated and impregnated fabric contains between 40 and 60% by weight of resin. The treated fabric or other sheet material may be dried by heating to a temperature ranging from, for example, room temperature to 130° C. depending, for instance, upon the amount and kind of solvent, if any, that is present in the coating and impregnating composition, the kind of base material treated with such composition, etc. In making laminated articles the temperature of bonding the laminae together may range, for example, from about 100° to 150° C. Any suitable pressure may be employed, for example from contact pressure up to about 1500 pounds or more per square inch.

The coating and impregnating compositions of this invention have a wide variety of commercial applications. For instance, they may be used in forming a finish coating on articles of various kinds, e. g., transformers and electrical coils. They may be employed in bonding together inorganic sheet materials, e. g., glass-fiber cloth, to form a laminate suitable for various uses, for instance in the construction of computer coils where such laminates provide greater dimensional stability under high humidity conditions and/or contact with water and greater toughness than are obtained with conventional materials; in making commutator cones and segments where ease of molding is desirable and where the laminates should have high heat resistance and high dielectric and physical strengths; and in making terminal boards, end washers, bushings and coil wrappers, especially in applications requiring a bond with an unmodified, polymerized mixture of a polyallyl ester and an unsaturated alkyd resin.

Other applications of the laminated products of this invention include their use as slot wedges, slot tubes, etc., in electrical motors and other electrical devices, as motor slot coil insulation, as bus bar insulation, in making tubing of all kinds, in making in whole or in part (e. g., flanges only) spools used in the manufacture of electrical coils, etc. The compositions of this invention also may be employed in bonding together mica flakes to form a laminated mica product and, also as a coil impregnant.

My new coating and impregnating compositions are especially suitable for use as laminating compositions for the reasons hereinbefore fully set forth. For example, they may be employed in making a commutator cone by punching or sawing a development pattern from a fabric, e. g., glass-fiber cloth, which has been treated as herein described with my new composition, forming the multi-layered pattern around a preform mold, inserting the preformed structure in a suitable mold cavity, and bonding the plies together under heat and pressure, e. g., at temperatures and pressures such as hereinbefore mentioned.

What I claim as new and desire to secure by Letters Patent of the United States, is:

1. A laminating composition comprising (1) an unsaturated alkyd resin obtained by reaction of ingredients including a dihydric alcohol and an alpha-unsaturated alpha, beta-dicarboxylic acid, (2) a diallyl ester of a dicarboxylic acid, the ingredients (1) and (2) being present, by weight, in the ratio of from 1 to 3 parts of (1) per part of (2), (3) a catalyst for accelerating the copolymerization of the ingredients of (1) and (2), and (4) a polyvinyl formal resin in an amount corresponding to form 15 to 75 per cent by weight of the total of (1), (2) and (4).

2. A laminating composition comprising (1) diethylene glycol maleate, (2) diallyl phthalate, the diethylene glycol maleate and diallyl phthalate being present, by weight, in the ratio of from 1 to 3 parts of the former per part of the latter, (3) a catalyst for accelerating the copolymerization of the ingredients of (1) and (2), and (4) a polyvinyl formal resin in an amount corresponding to from 15 to 75 per cent by weight of the total of (1), (2) and (4).

3. A laminating composition as in claim 2 which includes, in addition, a volatile solvent for the ingredients of (1), (2) and (4).

4. A laminating composition comprising diethylene glycol maleate and diallyl phthalate in the ratio of, by weight, about 1 to 3 parts of the former to 1 part of the latter, a small amount of benzoyl peroxide for accelerating the copolymerization of the said maleate and phthalate, and a polyvinyl formal resin in an amount corresponding to from about 20 to 30 per cent by weight of the combined weight of diethylene glycol maleate, diallyl phthalate and polyvinyl formal resin.

5. An article of manufacture comprising superimposed layers of glass-fiber cloth impregnated and bonded together with the heat-hardened laminating composition of claim 2.

6. A commutator cone comprising superimposed layer of glass-fiber cloth impregnated and bonded together with the heat-hardened laminating composition of claim 2.

7. A laminating composition comprising (1) diethylene glycol maleate and (2) diallyl phthalate in the ratio of, by weight, about 1 to 3 parts of the former to 1 part of the latter, (3) a small amount of a catalyst for accelerating the copolymerization of the ingredients of (1) and (2), and (4) a polyvinyl formal resin in an amount corresponding to form about 20 to 30%, by weight, of the combined weight of diethylene glycol maleate, diallyl phthalate, and polyvinyl formal resin.

JOHN A. LORITSCH.

REFERENCES CITED

The following references are of record in the file of this patent:

UNITED STATES PATENTS

| Number | Name | Date |
|---|---|---|
| 2,305,224 | Patterson | Dec. 15, 1942 |
| 2,308,495 | D'Alelio | Jan. 19, 1943 |
| 2,308,530 | McManus | Jan. 19, 1943 |
| 2,319,780 | Pellett | May 25, 1943 |
| 2,319,826 | Pellett | May 25, 1943 |
| 2,409,633 | Kropa | Oct. 22, 1946 |
| 2,465,710 | Clancy | Mar. 29, 1949 |

FOREIGN PATENTS

| Number | Country | Date |
|---|---|---|
| 540,168 | Great Britain | Oct. 8, 1941 |

OTHER REFERENCES

Powers, pp. 126 and 127, "Synthetic Resins and Rubbers," pub. 1943 by John Wiley and Sons, N. Y.